United States Patent [19]

Rosenfeld

[11] Patent Number: 5,513,524
[45] Date of Patent: May 7, 1996

[54] SYSTEM FOR MONITORING AIR PRESSURE IN A SPARE TIRE

[76] Inventor: Alan I. Rosenfeld, 229 Rte. 303, Tappan, N.Y. 10983

[21] Appl. No.: 287,297

[22] Filed: Aug. 8, 1994

[51] Int. Cl.[6] .................................. B60C 23/02
[52] U.S. Cl. ................. 73/146.3; 73/146.5; 73/146.8; 200/61.22; 200/61.25; 340/442
[58] Field of Search ................. 73/146.8, 146.3, 73/146.5; 340/442; 200/61.22, 61.25

[56] References Cited

U.S. PATENT DOCUMENTS

| 2,040,554 | 5/1936 | Holmes | 340/442 |
|---|---|---|---|
| 2,040,891 | 5/1936 | Wright et al. | 200/61.25 |
| 2,445,959 | 7/1948 | Luper | 200/61.25 |
| 3,241,112 | 3/1966 | Linkmeyer | 340/442 |
| 3,268,678 | 8/1966 | James | 200/61.22 |
| 3,462,735 | 8/1969 | Hawes | 200/61.22 |
| 3,860,772 | 1/1975 | Byrd | 200/83 N |
| 3,963,887 | 6/1976 | Takusagawa et al. | 200/83 L |
| 4,051,803 | 10/1977 | Arnone | 116/34 R |
| 4,117,281 | 9/1978 | Leimbach | 200/61.25 |
| 4,335,283 | 6/1982 | Migrin | 200/61.25 |
| 4,386,247 | 5/1983 | Couat | 200/61.25 |
| 4,425,558 | 1/1984 | McConchie | 340/442 |
| 4,734,674 | 3/1988 | Thomas | 340/442 |
| 4,814,745 | 3/1989 | Wang | 340/442 |
| 4,951,501 | 8/1990 | MacAnally | 73/146.8 |
| 5,025,244 | 6/1991 | Huang | 340/442 |

Primary Examiner—Richard Chilcot
Assistant Examiner—Paul D. Amrozowicz
Attorney, Agent, or Firm—Terry M. Gernstein

[57] ABSTRACT

Air pressure in a spare tire of a land vehicle is monitored and a driver is signalled if that air pressure drops below a pre-set level. However, the signal only occurs when the driver applies the brakes of the vehicle. A first switch electrically connects an alarm to power and closes when air pressure in the spare tire drops below the preset level. A second switch connects the first switch to power when the vehicle brakes are applied so that both the air pressure controlled switch and the brake lights must be operated in order for power to be applied to the alarm.

12 Claims, 4 Drawing Sheets

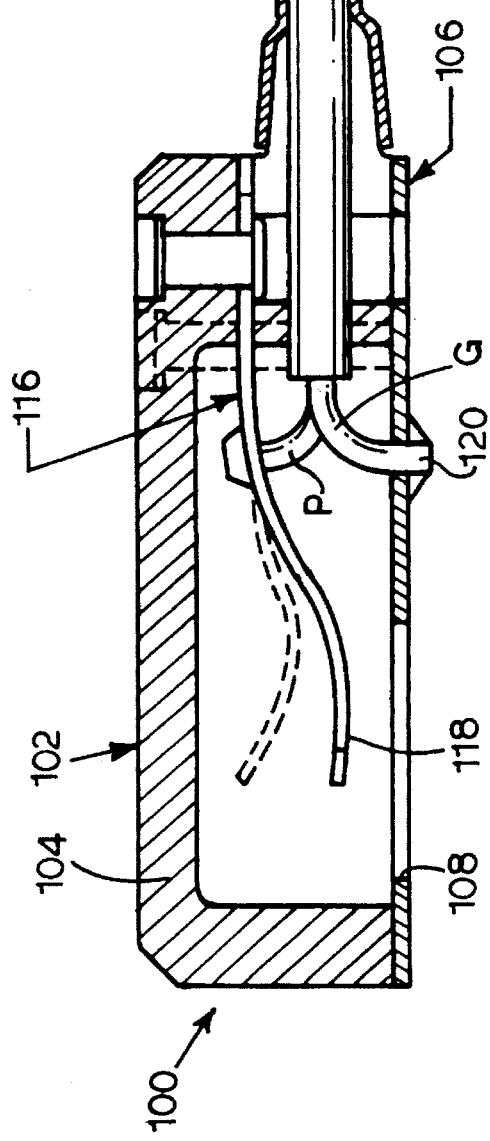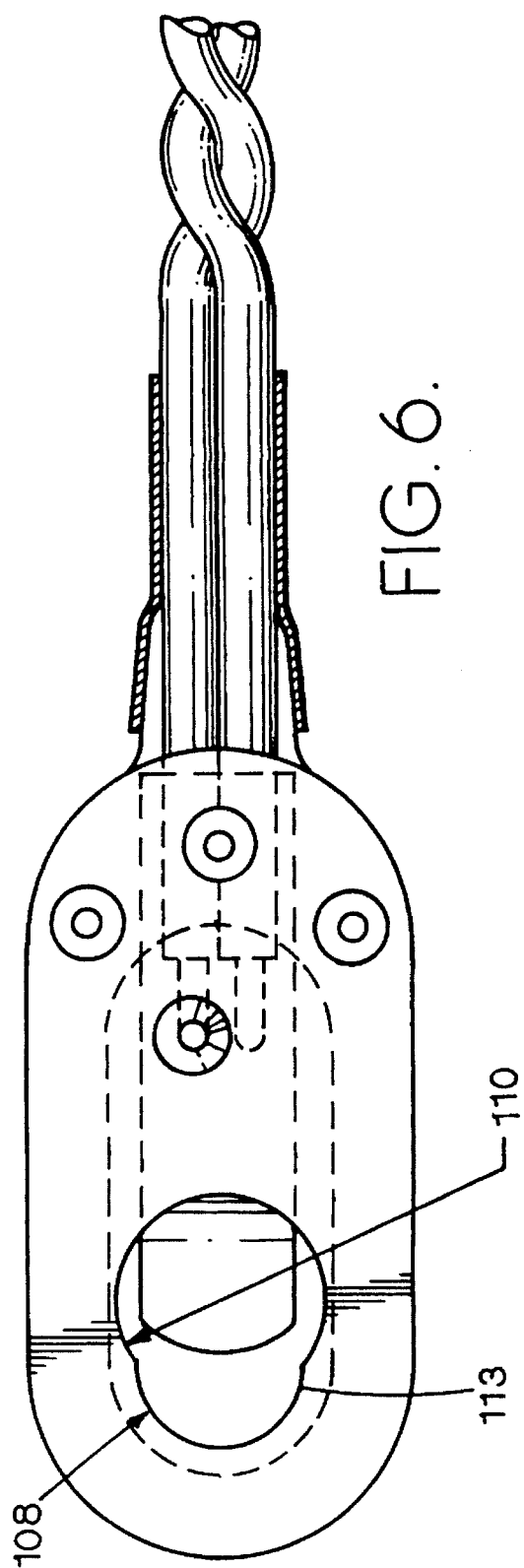

SYSTEM FOR MONITORING AIR PRESSURE IN A SPARE TIRE

TECHNICAL FIELD OF THE INVENTION

The present invention relates to the general art of land vehicles, and to the particular field of tire air pressure monitors for use in land vehicles.

BACKGROUND OF THE INVENTION

Most land vehicles, such as automobiles, have a spare tire that is stored on board in case one of the main tires springs a leak and becomes unusable. These spare tires are often carried for months, or even years, without being needed. During this period of inactivity, most spare tires are not monitored. Over time, these tires tend to lose air pressure. Thus, when a spare tire is needed, a user often finds that tire to be inoperable because its pressure is too low. Thus, many users do not find out that the spare tire needs air until it is too late.

For this reason, the art includes several devices for monitoring the air pressure in spare tires. While effective, these devices are often difficult to calibrate thereby making their accuracy, and hence, their effectiveness, suspect. The need for calibration is especially evident since people want their spare tires inflated to levels that suit their individual needs. For example, one person may use their vehicle only for city driving and will be close to filling stations during most driving times. This person need not have a spare tire that is fully inflated as only a short drive will be necessary for the spare tire. On the other hand, however, some people use their vehicles primarily for road driving. In such conditions, a filling station may be many miles away in the event a spare tire is needed. Therefore, a person using their vehicle for road driving may require their spare tire to be inflated to nearly optimum pressure as that tire may be needed for many miles. Still further, if the use of a vehicle changes from primarily road to primarily city driving as may occur if a new car is purchased to replace another car, the air pressure stored in the spare tire may be changed with the expected change in driving conditions.

Therefore, there is a need for a spare tire air pressure monitoring system that can be calibrated, and can be calibrated in situ.

Another drawback of many known devices is the difficulty in attaching the overall system to the spare tire. Thus, some people will not use the monitor because it is too much trouble to attach to and detach from the tire;

Therefore, there is a need for a spare tire air pressure monitoring system that is easily attached to and detached from a spare tire.

Yet another drawback to many known warning devices is the distraction that they can produce when they are alerting the vehicle driver that the air pressure in the spare tire is low. That is, once air pressure in the spare tire drops below the preset level, the low pressure signal is activated, but remains activated until the sensor is actually disconnected in some manner. This can distract a driver. Any distraction to the driver should be avoided as being undesirable.

Therefore, there is a need for a spare tire air pressure monitoring system which activates a low pressure signal only at certain times, which can be selected to adequately alert the driver that the spare tire air pressure is low, yet will not do so in a manner that may unduly distract the driver when he or she should not be distracted.

Since many spare tires are stored in small areas, the spare tire air pressure monitor should be small enough to be attached to a spare tire being stored in a small area.

Therefore, there is a need for a spare tire air pressure monitoring system that can be attached to a spare tire that is stored in a very small and confined area.

OBJECTS OF THE INVENTION

It is a main object of the present invention to provide a spare tire air pressure monitoring system.

It is another object of the present invention to provide a spare tire air pressure monitoring system that can be calibrated, especially in situ.

It is another object of the present invention to provide a spare tire air pressure monitoring system that can be easily attached to, and detached from, a spare tire.

It is another object of the present invention to provide a spare tire air pressure monitoring system that activates at a low pressure signal only at certain times.

It is another object of the present invention to provide a spare tire air pressure monitoring system that can be used in conjunction with a spare tire that is to be stored in small, confined areas.

SUMMARY OF THE INVENTION

These, and other, objects are achieved by a system that is mounted on a stem of a tire and is powered when the vehicle brake light system is operated so power is applied to the monitoring system only when the brakes of the vehicle are being applied. The system further includes a spring which biases a switch into a closed, signal activating, position. The spring bias is opposed by air pressure in the spare tire so that when air pressure in the spare tire drops below a pre-set level, the spring moves the switch into a closed position to activate the alarm when power is applied to the system, that is when the vehicle brakes are applied. Spring tension can be adjusted by a screw-controlled element whereby calibration of the devices can be adjusted so the device can be calibrated in situ. The system further includes a means for quickly and easily connecting and disconnecting the switch to the remainder of the circuit.

BRIEF DESCRIPTION OF THE DRAWING FIGURES

FIGS. 5 and 6 show a quick-connect element.

DETAILED DESCRIPTION OF THE PREFERRED EMBODIMENT OF THE INVENTION

Figure 1:
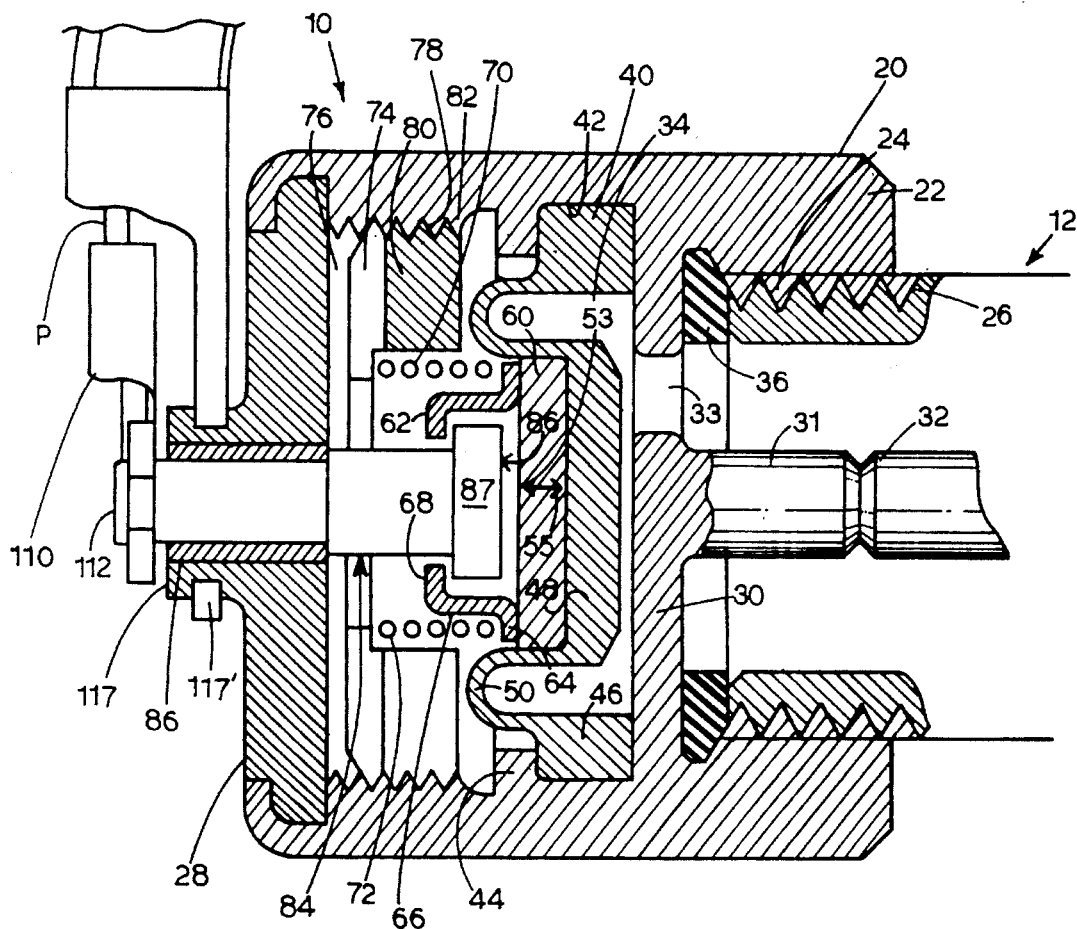
FIG. 1 shows a first form of a switch used in the stem-mounted tire pressure monitoring system.
Figure 2:
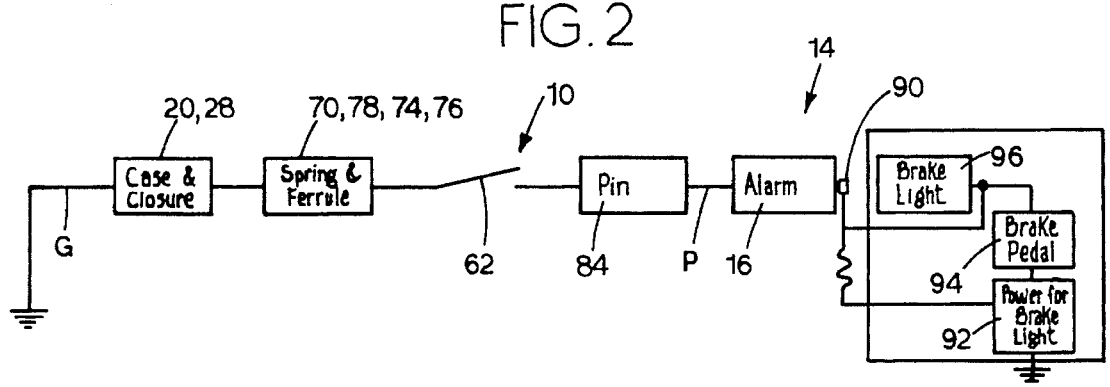
FIG. 2 is a block diagram illustrating the system.

Shown in FIGS. 1 and 2 is a switch 10 that is mounted on a valve stem 12 of a tire of a land vehicle. Switch 10 is part of an overall circuit 14 that activates an alarm 16 when air pressure in the tire to which the switch is mounted drops below a preset level, but only activates that alarm when the brakes of the vehicle are applied. Thus, a driver is aware of the low pressure, but is not unduly distracted because the alarm will only be activated when the brake pedal is applied. The alarm can include both visible and audible signals, or one or the other. The visible signal can include an LED mounted on the dashboard of the vehicle.

More specifically, switch 10 includes an electrically conductive casing 20 having a lower section 22 with an internal thread 24 that cooperatively engages external thread 26 on valve stem 12 to mount the casing on the valve stem. Casing 20 includes an electrically conductive cap 28 crimped onto the casing at a top end thereof, with the valve stem being connected to the casing at a lower end of that casing. A valve operating shoulder 30 is located in the casing above thread 24 and includes a projection 31 thereon that extends into a location to operate valve 32 of the tire valve and release air from the tire. A flow port 33 is located adjacent to shoulder 30 and air from the spare tire passes through this port into chamber 34 defined in the casing. Chamber 34 is defined between shoulder 30 and cap 28. An O-ring seal 36 is positioned between shoulder 30 and the top rim of the valve so the casing can be sealed to the valve.

A flexible diaphragm 40 is seated in a groove 42 defined in casing 20 between shoulder 30 and a second shoulder 44. Flexible diaphragm 40 includes a seating ring 46 captured in groove 42 and a central body 48 connected to seating ring 46 by an annular U-shaped portion 50. Pressure from air escaping from the tire is applied to central body 48, and central body 48 moves in directions 53 and 55 according to the level of pressure in the spare tire as will be understood from the discussion and teaching of this disclosure, with air pressure biasing central body in direction 53. Since casing 20 is closed, air pressure applied to flexible diaphragm 40 is essentially equal to the air pressure in the tire attached to valve 32.

A seating disc 60 is mounted on central body 48 to move therewith. Both diaphragm 40 and disc 60 are electrically non-conductive. An electrically conductive, hat-shaped switch contact 62 is seated on disc 60 for movement therewith. Contact 62 includes a base 64 attached to disc 60, a cylindrical body 66 attached at one end thereof to base 64 and having a radially inwardly extending annular shoulder 68 on the other end thereof. An electrically conductive spring 70 is seated at one end thereof on base 64 and biases contact 62, and hence central body 48, in direction 55 (toward valve stem 32 and against the air pressure exerted on diaphragm 40 by air from the tire). Top end 72 of spring 70 is located adjacent to a slot 74 in electrically conductive calibrating screw 78. Electrically conductive calibrating screw 78 threadably mounted on casing 20 by cooperation between screw thread 80 and thread 82 on the casing adjacent to chamber 34. Screw 78 is moved in directions 53 and/or 55 by removing cap 28, and using a screw driver to move the screw 78. Alternatively, slots can be defined in cap 28 through which a tool can fit to engage slot 74 to rotate screw 78 for pressure calibration before final crimping. This permits the spacing between the switch contacts of switch 10 to be adjusted for adjusting the sensitivity of the switch as well as for adjusting the level of air pressure that will close switch 10. From the foregoing description, it can be understood that first switch contact 62 is in electrical contact with casing 20. As will be discussed below, casing 20 is electrically connected to ground in the overall circuit 14. A first electrical lead G connects the casing to ground.

Switch 10 has a second electrical contact spaced from the first electrical contact 62 when air pressure in the tire associated with valve 32 is at or above a preselected level, which corresponds with accepted air pressure in that tire. When such spacing exists, the circuit 14 is open, and no power can be applied to alarm 16, as is indicated in FIG. 2. The second electrical contact of switch 10 includes switch contact element 84 fixedly mounted on casing 20 by an electrically insulating sleeve 86 fixedly mounted in cap 28. Second contact element 84 is thus stationary with respect to first contact element 62. Second electrical contact element 84 includes an electrically conductive T-shaped pin having a disc-shaped head 87 positioned inside body 66 and sized to contact shoulder 68 when contact 62 has moved in direction 55 beyond a predetermined distance, and to be spaced from shoulder 68 when air pressure in the tire is at or above a preset level. A second electrical lead P connects the second electrical contact element to alarm 14, which is connected to a power source, but is not connected to ground until switch 10 is closed.

Figure 3:
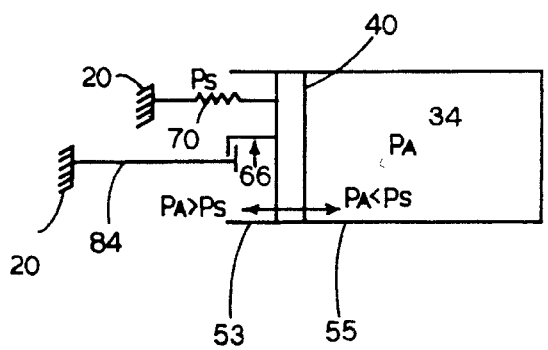
FIG. 3 illustrates the switch.

Spring 70 applies a bias to diaphragm 40 in direction 55, and air pressure in the tire applies a force to diaphragm 40 in direction 53. Thus, air pressure tends to open the switch and spring 70 tends to close the switch. As illustrated in FIG. 3, when air pressure, $P_A$, is at or above a pre-selected level, $P_S$, as set by spring 70 (in conjunction with the spring constant associated with diaphragm 40), diaphragm 40 tends to move in direction 53 until $P_A=P_S$ at which level, switch contact 66 remains stationary with respect to and spaced from switch contact 84, as indicated in FIG. 3. However, when air pressure in the tire drops, and $P_A$ drops, contact 62 moves in direction 55 and, if pressure continues to drop, and drops below a pre-set level, contact 62 will contact contact 84 thereby closing the switch and electrically connecting alarm 14 to ground. However, alarm 16 will not be activated until power is applied thereto. Power is applied to alarm 14 when the vehicle brakes are applied, and power is applied to the vehicle brake lights as alarm 16 is connected to the brake lights to receive power when those brake lights receive power.

Figure 4:
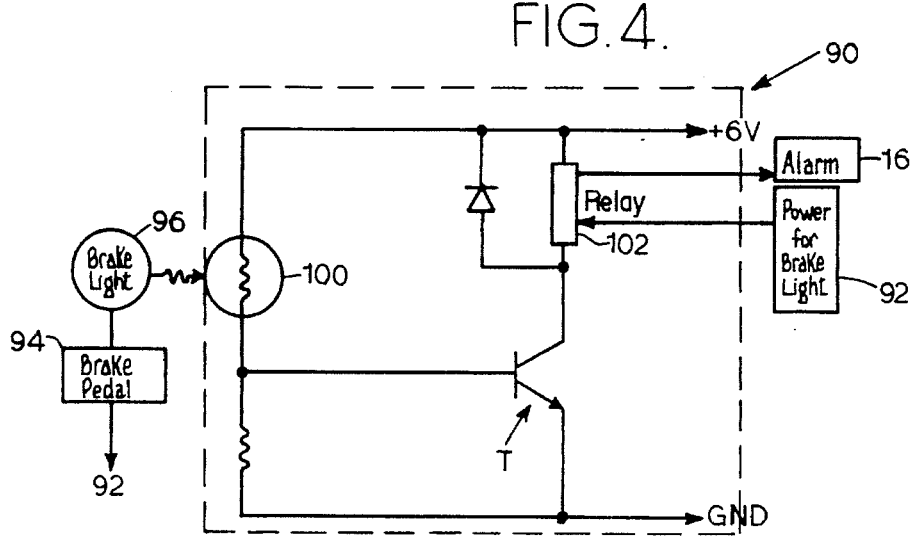
FIG. 4 is a photoelectric switch.

A photoelectric switch 90 is used in the circuit 14 to connect alarm 16 to power source 92 when brake pedal 94 is operated thereby lighting up brake light 96. Photoelectric switch 90 is shown schematically in FIG. 4 with CDS cell 100 resistance decreasing in the presence of light from brake light 96. Decreasing resistance of cell 100 turns on transistor T, which preferably is a 2N3904 relay driver to operate relay 102. Relay 102 is part of a normally open switch that is electrically inserted between switch 10 and power source 92 and is closed when the relay is operated. Operation of relay 102 establishes electrical connection between alarm 16 and power source 92. The preset level at which diaphragm 40 moves in direction 53 is set by moving adjusting screw 78 in directions 53 or 55. This permits the switch to be calibrated, and such calibration can be carried out when the switch is in position on valve stem 12, or in situ. It is noted that, while brake light activtion has been disclosed, other lights, including back up lights of the vehicle, can be used to activate the alarm system of the present invention. As will occur to one skilled in the art from the teaching of the present disclosure, the photocell 100 should be shielded from extraneous light so it will only be activated by the desired light, be it brake lights or back up lights.

A quick-connect element 100 is shown in FIGS. 5 and 6, and is used to connect switch 10 into circuit 14. Element 100 includes a housing 102 having an electrically insulating portion 104 and an electrically conductive bottom 106 fixed to that top. Bottom 106 is planar and includes a bipartite opening 108 defined therethrough. Opening 108 includes a first portion 110 that is sized to permit top 112 of pin 84 to pass through bottom 106 and a second portion 113 which is smaller than top 112 and which engages the sleeve 86 so that housing 102 is attached to sleeve 86 and hence is mounted on casing 20. Lead P is electrically connected to pin 84 by flexible connection 116 which is mounted on its proximal end to housing 102 and has a curved distal end 118 located to contact pin top 112 when rim 117 (FIG. 1), is engaged with bottom 106. Lead P is electrically connected to connection 116 near the proximal end of that connection as indicated in FIG. 5. Lead G is electrically connected to bottom 102 to make electrical contact with cap 28 via connection 120. It is noted that rim 117 passes through first portion 110 so that second portion 112, which is smaller than portion 110, can engage the groove of cap 28.

Figure 7:
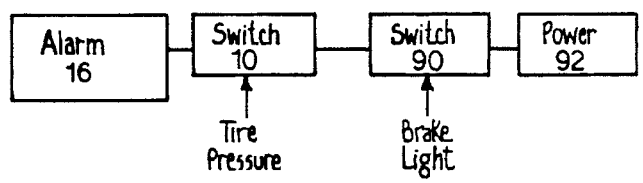
FIG. 7 is a block diagram showing the operation of the system in which the alarm will not be activated until at least one brake light of the vehicle associated with the spare tire is operated and the air pressure in the spare tire is below a pre-set level.

As can be understood from the foregoing, alarm 16 will only generate a signal when both switch 10 and switch 90 are closed. This is illustrated in FIG. 7 which shows power 92 connected to switch 90 which is normally open and which is closed when the vehicle brake light is activated. Once switch 90 is closed, power will be applied to switch 10, which is normally open. Thus, even though power is applied to switch 10, this power will not be applied to alarm 16 until switch 10 is closed. Switch 10 is closed when air pressure in the tire associated with that switch drops below a pre-set level. As discussed above, switch 10 will close as soon as the air pressure in the associated tire drops below the pre-set level, and will remain closed so long as the air pressure is below the pre-set level. Thus, once the air pressure in the associated tire drops below the pre-set level, switch 10 closes and remains closed. However, power is not applied to alarm 16, even though switch 10 is closed, until switch 90 closes, which occurs only when the vehicle brake light is activated. Thus, alarm 16 is activated only when both switches 10 and 90 are closed.

Figure 8:
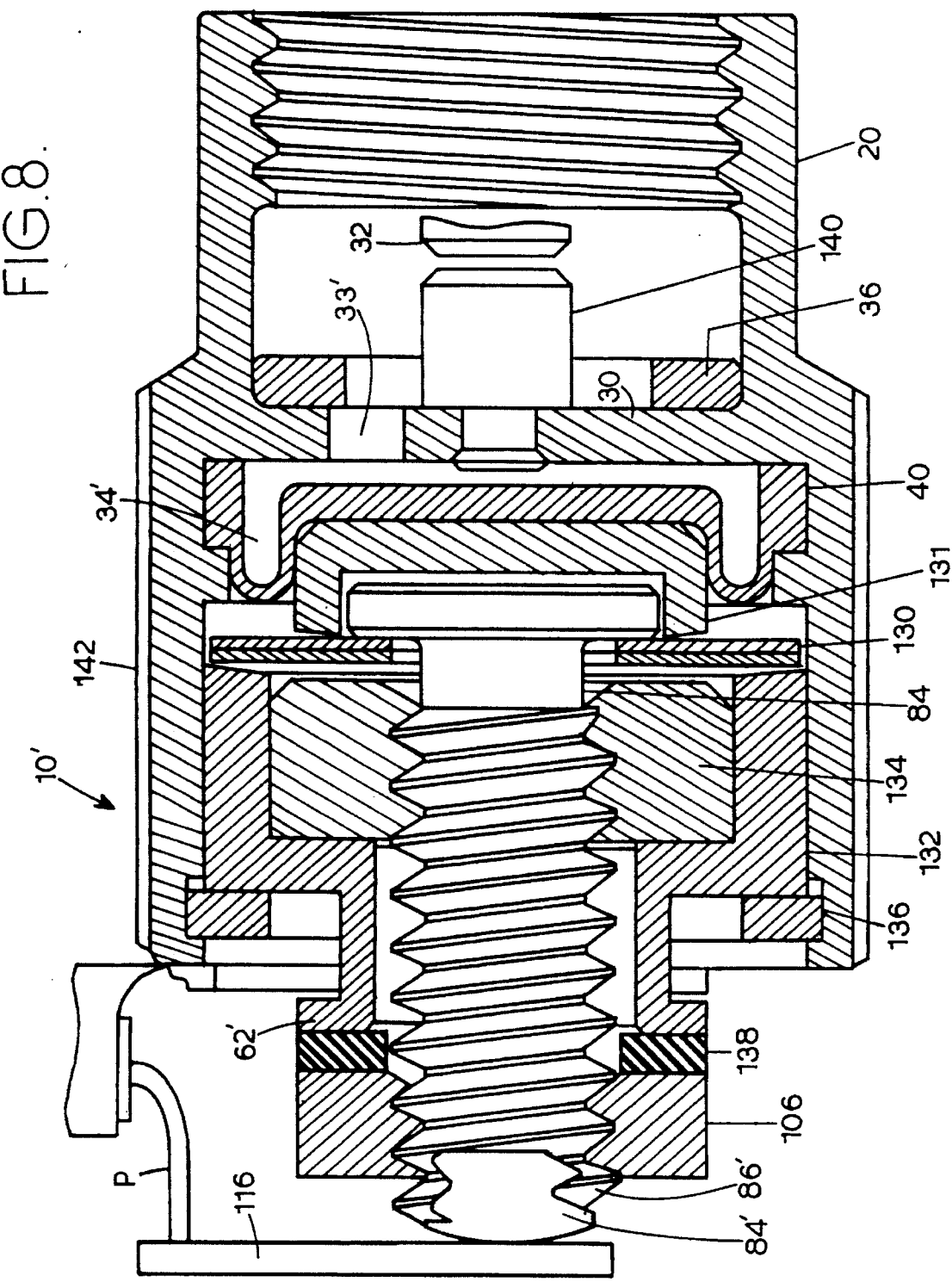
FIG. 8 shows a second form of the switch.

A second form of the switch is shown in FIG. 8 as switch 10'. Switch 10' operates in a manner that is identical to switch 10, and thus only the elements of switch 10' that differ from the corresponding elements in switch 10 will be described. Switch 10' includes a pin 84' that is threadably mounted in a threaded sleeve 86' whereby the spacing between pin 84' and switch contact 62' is directly adjustable by moving pin 84'. Switch contact 62' includes spring washers 130 mounted on diaphragm 40 via a spacer 131 for movement therewith and which are in abutting contact with a ground terminal 132 and a spacer 134 which is held in position in casing 20' by a spacer 136. An insulating washer 138 is interposed between bottom 106 and ground terminal 132 to ensure a tight fit between quick-connect element 100 and switch 10'. As is included in switch 10, switch 10' includes a projection 140 that operates valve 32 to release air from the tire into chamber 34' via port 33'. A case 142 encloses housing 20'.

Another means for preventing the alarm from distracting a driver can include a timing circuit connected to the alarm means. The timing circuit can be set to deactivate the alarm after a set period of activation. The alarm can be activated every time the vehicle is started, with the timing circuit deactivating the alarm after the pre-set period.

It is understood that while certain forms of the present invention have been illustrated and described herein, it is not to be limited to the specific forms or arrangements of parts described and shown.

I claim:

1. A system for monitoring air pressure in a land vehicle spare tire comprising:

A) a switch unit mounted on a stem of a spare tire and including
   (1) an electrically conductive casing,
   (2) means on said casing for opening a valve in the stem and permitting air in the spare tire to escape via the stem,
   (3) flexible, non-conductive diaphragm means mounted on said casing to be exposed to air pressure from the tire and for closing the casing and capturing the escaping air from the valve within the casing, said diaphragm means moving between a first position when air pressure in the tire is at or above a pre-set level and a second position when air pressure in the tire is below the pre-set level,
   (4) a first switch contact mounted on said diaphragm to move therewith,
   (5) electrically conductive spring means mounted on said first switch contact for biasing said first switch contact toward a closed position and biasing said diaphragm means via said first switch contact toward said second position and being electrically connected to said casing, and
   (6) a second switch contact fixed to said casing and positioned near said first switch contact to be in electrical contact with said first switch contact when said diaphragm means is in said second position, said second switch contact being electrically insulated from said casing and including a pin fixed to an electrically non-conductive sleeve, said sleeve being fixedly mounted on said casing;

B) a first electrical lead means for connecting said casing to ground;

C) an alarm means in a vehicle associated with the spare tire for signalling a driver when air pressure in the spare tire is below said pre-set level;

D) second electrical lead means for connecting said second switch contact to said alarm means;

E) power means connected to said alarm means so power is applied to said alarm means when said first and second switch contacts are in electrical contact with each other and when a brake light of the vehicle is activated so that power is available for said alarm means when the brakes of the vehicle are being applied whereby said alarm means is connected to said power means but is electrically separated from a complete circuit when said first and second switch contacts are spaced apart and is connected in a complete circuit with said power means when said first and second contact elements are in electrical contact with each other and at least one of the brake lights of said vehicle is operated; and F) a quick-connect means for electrically connecting said switch unit to said first and second lead means, said quick-connect means including a housing having an electrically insulating top and an electrically conductive bottom, an opening through said bottom, means on said bottom for electrically connecting said bottom to said casing, a flexible electrical contact element mounted at one end thereof on said top and having a second end located above said opening and being electrically connected to said second electrical lead means, said second end electrically contacting said second switch contact when said quick-connect means is attached to said switch unit.

2. The system defined in claim 1 further including switch means for connecting said alarm means to said power means when at least one of the brake lights of the vehicle is operated.

3. The system defined in claim 2 wherein said first switch contact includes a hat-shaped element.

4. The system defined in claim 1 further including a disc element mounting said first switch contact on said diaphragm.

5. The system defined in claim 1 further including a spring bias adjusting means for altering the amount of bias exerted by said spring means on said first switch contact.

6. The system defined in claim 5 wherein said spring bias adjusting means includes a screw thread on said casing, a threaded nut threadably connected to said casing, and a shoulder on said threaded nut engaging said spring means.

7. The system defined in claim 6 wherein said threaded nut is electrically conductive.

8. The system defined in claim 1 further including a closure cap on said casing, said sleeve being mounted on said closure cap.

9. The system defined in claim 1 wherein said opening includes a first portion which is sized to permit said second switch contact to pass through said bottom and a second portion that is sized so said bottom engages said sleeve adjacent to said opening.

10. The system defined in claim 2 wherein said switch means includes a photoelectric switch.

11. The system defined in claim 1 further including an O-ring seal adjacent to said means on said casing for opening the tire valve.

12. A system for monitoring air pressure in a land vehicle spare tire comprising:
   A) a switch unit mounted on a stem of a spare tire and including
      (1) an electrically conductive casing,
      (2) means on said casing for opening a valve in the stem and permitting air in the spare tire to escape via the stem,
      (3) flexible, non-conductive diaphragm means mounted on said casing to be exposed to air pressure from the tire and for closing the casing and capturing the escaping air from the valve within the casing, said diaphragm means moving between a first position when air pressure in the tire is at or above a pre-set level and a second position when air pressure in the tire is below the pre-set level,
      (4) a first switch contact mounted on said diaphragm to move therewith,
      (5) electrically conductive spring means including two spring washers mounted on said first switch contact for biasing said first switch contact toward a closed position and biasing said diaphragm means via said first switch contact toward said second position and being electrically connected to said casing, and
      (6) a second switch contact fixed to said casing and positioned near said first switch contact to be in electrical contact with said first switch contact when said diaphragm means is in said second position, said second switch contact being electrically insulated from said casing and including a threaded body portion, and said switch unit including a sleeve means on said casing and having a threaded portion that cooperatively engages thread in said threaded portion on said second switch contact;
   B) a first electrical lead means for connecting said casing to ground;
   C) an alarm means in a vehicle associated with the spare tire for signalling a driver when air pressure in the spare tire is below said pre-set level;
   D) second electrical lead means for connecting said second switch contact to said alarm means;
   E) power means connected to said alarm means so power is applied to said alarm means when said first and second switch contacts are in electrical contact with each other and when a brake light of the vehicle is activated so that power is available for said alarm means when the brakes of the vehicle are being applied whereby said alarm means is connected to said power means but is electrically separated from a complete circuit when said first and second switch contacts are spaced apart and is connected in a complete circuit with said power means when said first and second contact elements are in electrical contact with each other and at least one of the brake lights of said vehicle is operated;
   F) an element on said diaphragm engaging one of said washers;
   G) a ground plug mounted on said casing and engaging said washers; and
   H) an insulating washer surrounding said threaded sleeve and engaging said ground plug.

* * * * *